J. Paterson,
Cheese Press.
N°. 32,142.    Patented Apr. 23, 1861.
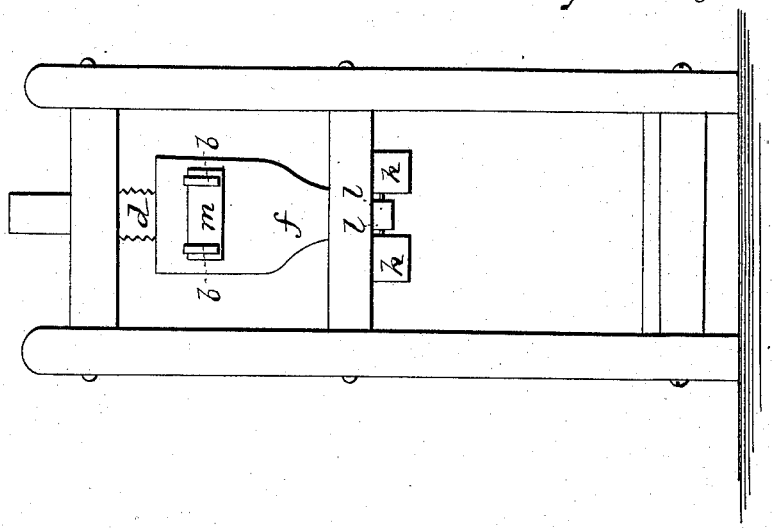
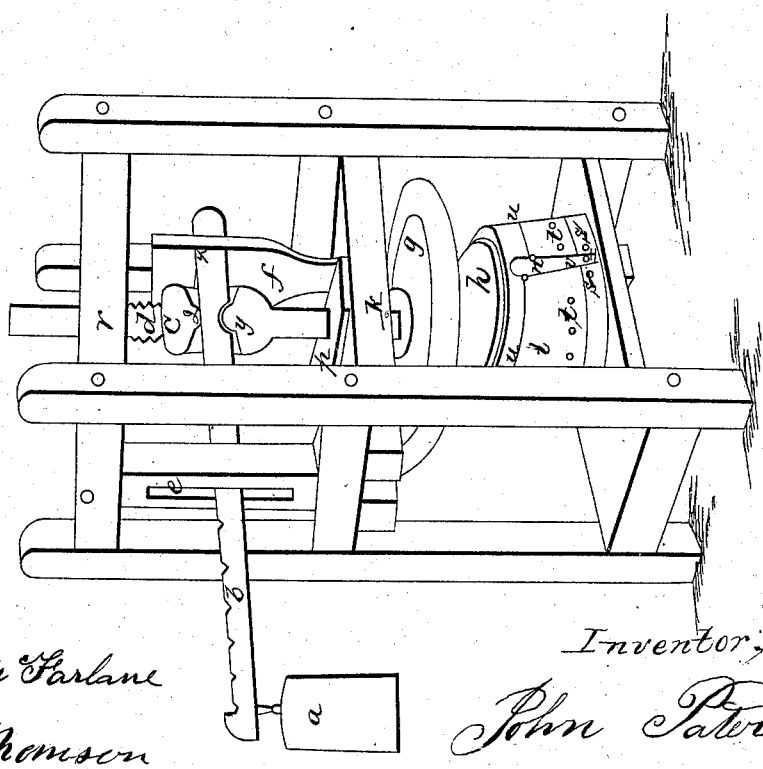
Witnesses:
William McFarlane
Hugh Thomson
Inventor:
John Paterson

UNITED STATES PATENT OFFICE.

JOHN PATERSON, OF INDIANAPOLIS, INDIANA.

CHEESE-PRESS.

Specification of Letters Patent No. 32,142, dated April 23, 1861.

*To all whom it may concern:*

Be it known that I, JOHN PATERSON, of Indianapolis, in the county of Marion and State of Indiana, have invented a new and useful Improvement in Cheese-Presses; and I do hereby declare that the following is a full, clear, and exact description of the construction and operation of the same, reference being had to the annexed drawings, making a part of this specification, in which each like letter represents like parts of the same machine.

The nature of my invention consists in the combination of a weighted lever, screw, and nut, arranged in such a manner as to enable it to be adjusted, so as to renew the weight upon the cheese after the lever has sunk so low by the continued pressure on the cheese as to loose its direct pressure, or perpendicular force; also a device for slackening the cheese vat or tub so that the cheese will easily drop out when the vat is turned over.

To enable others skilled in the art to make and use my invention, I will proceed to describe its construction and operation.

Figure 1 is a perspective view of the press. Fig. 2 is an end view of the same.

(*d, d*) is a screw and shaft extending through nearly the whole depth of the press having for its guides the two cross-pieces (*r*) and (*p*) and through which it works up and down loosely.

(*c*) is a nut in which the screw (*d, d*) works. The small figure (2) and the letter (*y*) are projecting lugs formed out of the side of the nut (*c*.) The under lug (*y*) forms a half round joint to correspond with a recess formed in the lever (*b, b, b,*) in which it is made to fit.

(*b, b, b,*) is a lever having on one end the movable weight (*a,*) and the other end is made with two forks, each fork passing along on opposite sides of the nut (*c*) and between the two lugs (2) and (*y,*) and working on the lug (*y,*) from thence extending through the slot (*m,*) in the piece (*f, f.*)

(*x*) is a notch or indentation. This is designed to prevent the piece (*f, f,*) and the forks of the lever *b, b, b*, from separating as they fit and work into each other by this necessary provision.

(*l, l*) is a bolt or pin running through the two cross-pieces (*k, k, k,*) and the piece (*f, f,*) and upon which the piece (*f, f,*) works forward and back according to the rise and fall of the lever (*b, b, b.*)

(*e*) is a long mortise in which the lever (*b, b, b,*) plays up and down.

(*g*) is a hand-wheel attached to the screw shaft (*d, d,*) and by which the operator raises and lowers the lever (*b, b, b.*)

(*h*) is the follower loosely connected with the lower end of the screw shaft (*d, d*) and which is brought in direct contact with the cheese to be pressed.

(*i*) is a cheese tub or vat which holds the cheese to be pressed. The staves of this tub (*i*) are held together by an ordinary hoop at the bottom and in a stationary manner, while the top part of them are left loose and without any hoop whatever save an adjustable or tightening wire hoop which is designated by the letters (*u, u.*) This wire hoop is retained in its place by being passed through little staples around the tub and both ends of the loop (*u, u,*) are connected with the hand or tightening lever (*n*) which is drawn forward or back as the case may require, and is held to a certain point by the pin (*v,*) which pin is made fast in the lever, (*n*) being set in either one of the holes (*s, s.*)

(*t, t,*) are perforated holes. These are designed to draw off the cheese water or whey. These are formed also in the bottom of the tub (*i.*)

(2) is a projecting lug formed opposite and above the lug (*y.*) Each of these two lugs (2) and (*y*) point toward each other. The lug (*y*) forms the fulcrum of the lever (*b, b, b,*) and supports it, and the top lug (2) serves to prevent the nut (*c,*) with the screw shaft (*d, d,*) from falling down through the forks of the lever (*b, b, b.*) The lug (2) is also designed to enable the operator to raise the screw shaft (*d, d,*) with the follower (*h,*) up out of the way of the tub (*i*) so as to take out the cheese after it is pressed.

Thus it will be seen by the description here given that the forked end of the lever (*b, b, b,*) is locked into and held by the upright piece (*f, f,*) and having its fulcrum point at its junction with the lug (*y,*) in the nut (*c,*) and by this the whole weight of leverage and the weight (*a*) is brought directly upon the nut (*c,*) and the screw shaft (*d, d,*) which works into the nut (*c,*) and when the operator turns the hand wheel (*g,*) which is fastened to the screw shaft (*d, d,*)

either way the lever (*b, b, b,*) is raised or lowered, and when the cheese to be pressed has received such a pressure as to create a sinking of the lever (*b, b, b,*) the operator has nothing more to do than simply to turn the wheel (*g,*) to raise the lever (*b, b, b,*) to such a height as to bring all the force and weight upon the cheese anew.

In consequence of the rising and falling of the lever (*b, b, b,*) at the end where the weight (*a*) is hung it will create some little vibrating motion at the opposite end, in the upright piece (*f, f,*) which is connected with the forked end of the lever (*b, b, b.*) This motion is accommodated by the piece (*f, f,*) being loose on the pin or joint (*l, l,*) and is moved to and fro by the gripping recess or notch (*x.*) This notch (*x*) is designed to keep the lever (*b, b, b,*) from slipping out of its place, or rather it is intended to prevent the piece (*f, f,*) slipping off the lever (*b, b, b,*) and out of its place, in which case quite an injury would likely be sustained by the screw shaft (*d, d*) being bent by the falling of the weighted end of the lever (*b, b, b.*)

Now the advantages of this press appear quite obvious, inasmuch as its efficiency and simplicity is such as to create a doubt that it has a rival. It is so constructed and convenient that almost any one of a domestic circle can operate it. It needs no great muscular power whatever. It is without complicated parts where secret or difficult nuts or screws are to be worked by wrenches, and the parts are so arranged and easy of access that everything is done without a resort to the climbing of stools, ladders or platforms.

What I claim as being new and desire to secure by Letters Patent is—

The arrangement and combination of the two lugs (2) and (*y*) with the forked lever (*b, b, b,*) the upright piece (*f, f,*) the notch or curvature (*x,*) the slot (*m*) or its equivalent, the pin (*l, l,*) the hand lever (*n*) the tightening wire hoop (*u, u,*) the pin (*v,*) and the stop holes (*s, s,*) as and for the purpose set forth.

JOHN PATERSON.

Witnesses:
WILLIAM MCFARLANE,
HUGH THOMSON.